Patented Dec. 1, 1925.

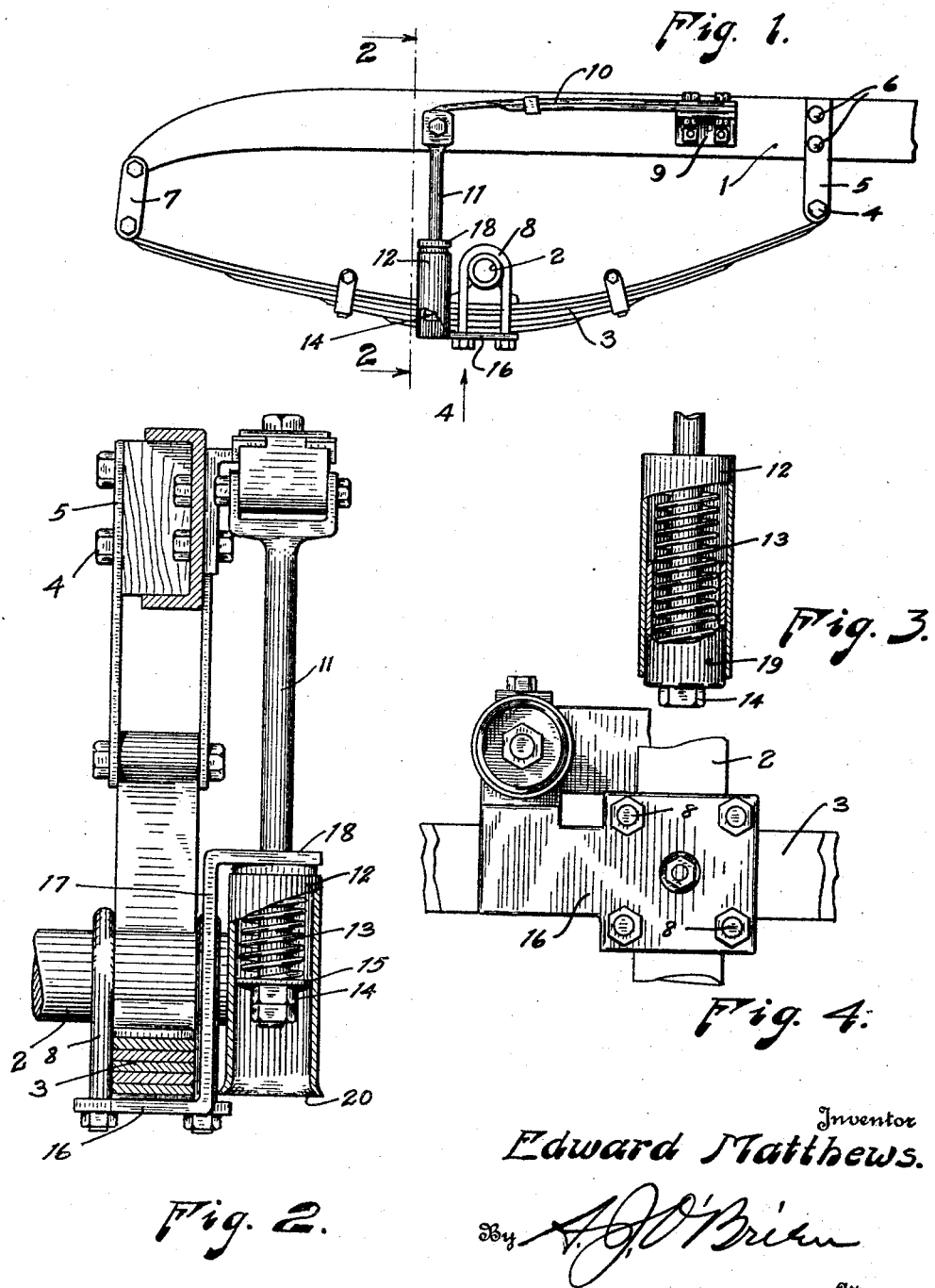

1,564,088

UNITED STATES PATENT OFFICE.

EDWARD MATTHEWS, OF DENVER, COLORADO, ASSIGNOR OF ONE-HALF TO WILLIAM P. TICHENOR, OF DENVER, COLORADO.

SHOCK ABSORBER.

Application filed June 25, 1924. Serial No. 722,263.

*To all whom it may concern:*

Be it known that I, EDWARD MATTHEWS, a citizen of the United States, residing at Denver, the city and county of Denver, and State of Colorado, have invented certain new and useful Improvements in Shock Absorbers; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to shock absorbers for use in connection with automobile springs.

It is well known that automobiles and other vehicles having spring supported bodies have a tendency to throw upwardly with great force on the rebound. The longer and more resilient the springs are the greater and more violent will be the rebound. It has often happened that occupants of the rear seats of automobiles have been catapulted upwardly against the top or the roof of the car with sufficient force to cause serious injury. To avoid this violent rebound, a class of devices, variously known as "snubbers" or "shock absorbers," have been devised and used to a greater or less extent.

It is the object of this invention to produce a device that can be readily applied to the springs of almost any make of automobile, and which will improve the riding qualities of the machine with light loads and eliminate to a great extent the objectionable rebound.

My invention can be best described and will be most readily understood when reference is had to the accompanying drawing in which the preferred embodiment thereof is illustrated, and in which:

Fig. 1 is a side view of a portion of a chassis frame showing my device attached thereto, a portion of the spring casing being broken away to better show the construction;

Fig. 2 is a section taken on line 2—2, Fig. 1;

Fig. 3 is a view showing a slight modification; and

Fig. 4 is a view looking upwardly in the direction of the arrow 4 in Fig. 1.

Numeral 1 represents the chassis frame, 2 the axle and 3 a semi-elliptical spring whose front end is pivoted at 4 to the lower end of the spaced brackets 5 which are secured to the frame 1 by means of bolts or rivets 6.

The rear end of the spring is attached to the rear end of the frame member 1 by means of shackles 7 and is connected to the axle 2 by means of U-shaped clamping bolts 8. Secured to the frame 1 is a short piece of angle iron 9 to which a multiple leaf cantilever spring 10 is connected. A rod 11 is pivotally connected to the end of the spring 10 and extends downwardly into the spring casing 12 where it projects through the helical spring 13. Secured to the lower end of rod 11 are nuts 14, the upper of which is separated from the spring 13 by a washer 15. The lower one of nuts 14 serves as a lock nut. A bracket comprising a plate 16 provided with four holes for the reception of the ends of the U-bolts 8, has an upwardly extending part 17 whose end 18 is bent outwardly at right angles and is perforated for the reception of the bar 11. The part 18 serves as an abutment for the upper end of the spring casing 12, which is forced against it by the action of the spring 13.

Let us now consider a case in which the parts are assembled in the manner shown in Fig. 1. The nuts 14 are screwed onto the bolt 11 a sufficient distance to compress the spring 13 to such an extent that considerable tension is developed in the bar 11. In actual practice the spring 13, when the parts are in normal, unloaded position, occupies only one-half of the length of the casing 12. The tension in bar 11 acts like a load and causes a corresponding amount of flexure in the spring 3. The tension caused by the compression of spring 13 diminishes as the flexure of spring 3 increases and therefore produces better riding qualities with light loads, but does not interfere with the action of the spring 3 with heavy loads.

It is apparent from an inspection of Fig. 1 that any movement of the chassis frame 1 away from the axle 2, will be resisted by springs 10 and 13 and the greater the upward movement of the chassis the greater will be the resisting force. Let us now assume that the car has just passed over an irregularity in the road surface, which has caused the frame 1 to approach the axle, the spring 3 will now tend to assume its normal shape and will move the frame 1 upwardly. This upward movement is resisted by the action of the springs 10 and 13, which will cause the frame to come to a gradual stop. The action of my device is quick and positive and produces an easier riding car than when friction or dash-pot devices are employed, for the reason that it responds regardless of the speed at which the movement takes place.

In Fig. 3 I have shown a slight modification in which the washer 15 is replaced by a cylindrical cup that projects into the spring casing. By means of this construction the casing 12 can be made shorter in proportion to the movement of the spring 13. When a casing like that shown in Fig. 2 is used, the lower end should be flared in the manner indicated by numeral 20, as this will preclude the nuts 14 or the washer 15 from catching on the end of the casing.

It is evident that my device is in no way limited to use in combination with a semi-elliptical spring and that it can be employed with equal success with cantilever or any other kind of spring, as the spring casing 12 may be attached to the axle at any point and the spring 10 to a corresponding portion of the chassis frame.

Having now described my invention, what I claim as new is:

1. In combination, an automobile chassis frame member, a spring operatively associated therewith, a supporting axle secured to the spring so as to be adapted to move towards and away from the frame member, a second spring secured to the frame member so as to have a part thereof stationary with respect to the frame and another part thereof adapted to be moved relative to the frame, a third spring secured to the axle in such a manner that a portion thereof is stationary with respect to the axle while the remainder of the spring is adapted to move relative to the axle and an adjustable link for connecting the movable portions of the last named springs whereby the first mentioned spring will resist movement of the frame member towards the axle, while the other two springs tend to resist the movement of the frame member away from the axle, the second and third springs being of different strength.

2. A device in accordance with claim 1 in which the weaker spring has means associated therewith for limiting the amount of flexure.

3. In combination, an automobile chassis frame member, a spring operatively associated therewith, a supporting axle secured to the spring so as to be adapted to move towards and away from the frame member, a cantilever spring having one end thereof rigidly secured to the frame member, a bracket secured to the axle, a helical spring having one end abutting a portion of the bracket, a tension member having one end secured to the end of the cantilever spring, said tension member passing through the bracket and through the interior of the helical spring and means for adjusting the distance between the end of the cantilever spring and the free end of the helical spring.

4. A device in accordance with claim 3 in which the helical spring is enclosed in a tubular member and in which the tension member and adjusting means is a rigid bar having its lower end threaded and provided with an adjusting nut.

5. A system of spring suspension for the body of a vehicle comprising, in combination, an axle, a chassis frame member, means for supporting the frame member above the axle, said means comprising a spring which permits the chassis frame member to move towards and away from the axle and means for cushioning the recoil of the spring means, said last named means comprising a cantilever spring having one end secured to the frame member, a bracket secured to the axle, a tubular casing secured to the underside of the bracket, a helical spring in said tubular casing, a rod projecting through the helical spring, said rod having one end connected to the end of the cantilever spring and means for adjusting the tension in the rod.

In testimony whereof I affix my signature.

EDWARD MATTHEWS.